Patented Jan. 3, 1950

2,493,191

UNITED STATES PATENT OFFICE 2,493,191

MANUFACTURE OF 2.7-DIAMINOACRIDONE

Alan August Goldberg and William Kelly, Bradford-on-Avon, England, assignors to Ward, Blenkinsop & Company Limited, Liverpool, England, a British company No Drawing. Application March 8, 1946, Serial No. 653,162. In Great Britain March 12, 1945

9 Claims. (Cl. 260—279)

This invention relates to a new and improved process for the manufacture of 2.7-disubstituted acridones in which the substituents each contain a nitrogen atom directly linked to a nuclear carbon atom. Among such acridones is the valuable 2.7-diaminoacridone having the formula

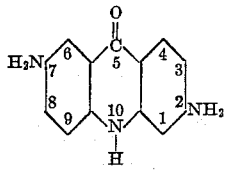

(according to the nomenclature of the Chemical Society of London) from which the pharmacologically valuable 2.7-diaminoacridine can be obtained.

The process, according to the present invention, for the production of a 2.7-substituted acridone comprises heating a 3′:4-disubstituted diphenylamine-2-carboxylic acid of the general formula

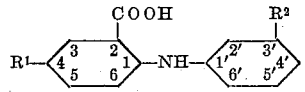

in which $R^1$ is an amino group, a substituted amino group, a protected amino group or a nitro, nitroso, azo, hydrazo or hydroxylamino group and $R^2$ is an amino group, a substituted amino group, a protected amino group or an azo, hydrazo or hydroxylamino group, with sulphuric acid.

The invention includes a process for the production of 2.7-diaminoacridone which comprises heating a 3′:4-disubstituted diphenylamine-2-carboxylic acid of the general formula set forth above in which $R^1$ and $R^2$ are amino and/or acylamino groups, with sulphuric acid. Preferably the diphenylamine-2-carboxylic acid employed is a 3′-amino-4-acylamino-diphenylamine-2-carboxylic acid such as 3′-amino-4-acetylamino-diphenylamine-2-carboxylic acid.

The invention also includes a process for the production of 2-amino-7-nitroacridone which comprises heating a 3′-amino- or 3′-acylamino-4-nitrodiphenylamine-2-carboxylic acid with sulphuric acid.

It is known that the cyclisation of 3′-nitro-diphenylamine-2-carboxylic acid yields 4-nitroacridone, i. e. ring closure takes place on to the 2′-position. It is therefore the more surprising that when the 3′-nitro group is replaced by an amino group, a substituted amino group, a protected amino group or an azo, hydrazo or hydroxylamino group the ring closure should proceed, to a major extent, in a different manner, i. e. the ring closure takes place on to the 6′-position thereby yielding a derivative of 2-aminoacridone.

The group $R^1$ in the above general formula may be an amino group, a substituted amino group, such as a monoalkyl or dialkylamino group, a protected amino group, such as an acylamino group or a nitro, nitroso, azo, hydrazo or hydroxylamino group. The group $R^2$ in the general formula may be an amino group, a substituted amino group, a protected amino group or an azo, hydrazo or hydroxylamino group.

The sulphuric acid employed may be 98% or 100% concentrated acid or it may have been diluted to some extent with water. The acid may be employed alone or together with additional substances such as phosphoric acid and/or anhydrous boric acid. Preferably concentrated sulphuric acid is employed. Heating periods of the order of 1½ to 2 hours at 100° C. have been found to be sufficient with concentrated acid. Somewhat longer times should be employed at lower temperatures and correspondingly shorter times at higher temperatures if these are employed. In general we prefer to avoid the use of substantially higher temperatures on account of secondary reactions which may occur.

It has been found that when one or both of the groups $R^1$ and $R^2$ is or are an acylamino group or groups the cyclisation of the diphenylamine-2-carboxylic acid is usually accompanied by simultaneous deacylation. Examples of simultaneous deacylation and ring closure are the action of hot sulphuric acid upon the 3′-amino-4-acylamino-diphenylamine-2-carboxylic acid, for example 3′-amino-4-acetylamino-diphenylamine-2-carboxylic acid, to give 2.7-diaminoacridone, and upon 3′-amino- and the 3′-acylamino-4-nitrodiphenylamine-2-carboxylic acids, for example 3′-acetylamino-4-nitro-diphenylamine-2-carboxylic acid, to give 2-amino-7-nitroacridone.

When the group $R^1$ is a nitro, nitroso, azo, hydrazo or hydroxylamino group and/or the group $R^2$ is an azo, hydrazo or hydroxylamino group, the resulting acridones containing these groups as substituents may be readily reduced to free amino groups by the use of any of the known agents for the reduction of such groups to amino groups when present as substituents in an aromatic nucleus. Such reduction can readily be carried out by the use of tin and an excess of hydrochloric acid or preferably by the use of stannous chloride dissolved in hydrochloric acid. For example, 2-amino-7-nitroacridone can be readily reduced by stannous chloride dissolved in hydrochloric acid to 2.7-diaminoacridone. The reduction is preferably carried out in the warm, temperatures of 80° to 90° C. being very suitable. The acridone is added portionwise to the reducing solution so as to maintain the temperature within the desired range. The resulting stannichloride is decomposed with aqueous alkali and the resulting 2.7-diaminoacridone purified. The reduction may be carried out substantially as described in Example 3 of copending application of Alan August Goldberg, Serial No. 647,187, for "Improvement in process for the production of 2.7-dinitroacridone" with suitable adjustment of the amount of starting material having due regard for the fact that there is only one nitro group to be reduced in 2-amino-7-nitroacridone.

The 2.7-diaminoacridone may then, in turn, be reduced to 2.7-diaminoacridine. This is preferably carried out using an alkali metal amalgam, such as sodium amalgam, in neutral or slightly alkaline solution. Reduction to the corresponding acridane occurs in this process and it is necessary to reoxidize to the acridine. This may be carried out by passing a stream of oxygen or air into a stirred suspension of the acridane preferably in the presence of a ferric salt, such as ferric chloride; preferably this reoxidation is carried out at a temperature somewhat above room temperature, i. e. at about 50°–70° C., preferably about 60° C. The production of 2.7-diaminoacridine from 2.7-diaminoacridone by this process is described in detail in Example 4 of the aforesaid copending application Serial No. 647,187.

The thus produced 2.7-diaminoacridine can be readily converted into the monohydrochloride by suspending the compound in hot water, adding the theoretical amount of hydrochloric acid to convert to the monohydrochloride and salting out the resulting salt by the addition of a salting out solution of an alkali chloride, such as sodium or ammonium chloride. This procedure also is described in detail in Example 4 of copending application Serial No. 647,187.

It is found that good yields of 2.7-disubstituted acridones, especially 2-amino-7-nitroacridone and 2.7-diaminoacridone can be obtained by the cyclization procedure described and the products need little, if any, purification when used in the production of 2.7-diaminoacridine.

The following examples illustrate the manner in which the invention may be carried into effect.

*Example 1*

60 parts of 3'-amino-4-acetylamino-diphenylamine-2-carboxylic acid is added to 773 parts of concentrated sulphuric acid and the mixture heated for 2 hours at 100° C. The reaction mixture is then cooled, 200 parts of water is added and it is then heated again for a further 30 minutes at 100° C. The mixture is then basified with ammonia whereupon 40 parts of crude 2.7-diaminoacridone is obtained. Upon recrystallization from aqueous pyridine the 2.7-diaminoacridone is obtained pure, in the form of brown crystals, having a melting point of 350–352° C.

*Example 2*

35 parts of 3'-amino-4-nitrodiphenylamine-2-carboxylic acid is heated with 480 parts of sulphuric acid at 100° C. for 1½ hours and the solution poured on to an excess of crushed ice. The insoluble material is filtered off, stirred with an excess of dilute aqueous ammonia and the crude 2-amino-7-nitroacridone (30 parts) collected. Reduction of this with stannous chloride and hydrochloric acid in known manner yields 2:7-diaminoacridone in excellent yield as a yellow brown powder M. Pt. 350–352° C.

The 3'-amino-4-nitro-diphenylamine-2-carboxylic acid employed is conveniently obtained by condensing 2-chloro-5-nitrobenzoic acid and meta-phenylene diamine by the general procedure of the Ullman reaction.

*Example 3*

37 parts of 3'-acetamido-4-nitro-diphenylamine-2-carboxylic acid is heated with 480 parts of sulphuric acid at 100° C. for 2 hours. The solution is cooled, 120 parts of water added and the heating continued at 100° C. for a further ½ hour. 28 parts of 2-amino-7-nitroacridone is isolated in the same manner as described in the foregoing example.

The 3'-acetamido-4-nitro-diphenylamine-2-carboxylic acid is obtained by the acetylation of an aqueous solution of 3'-amino-4-nitro-diphenylamine-2-carboxylic acid (obtained as described in Example 2) with acetic anhydride which readily affords 3'-acetamido-4-nitro-diphenylamine-2-carboxylic acid M. Pt. 294° C.

What we claim is:

1. A process for the production of a 2.7-disubstituted acridone in which each of the substituents contains a nitrogen atom directly linked to a nuclear carbon atom which comprises heating a 3':4-disubstituted diphenylamine-2 - carboxylic acid of the general formula

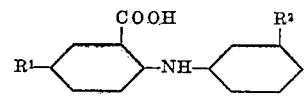

in which $R^1$ is selected from the group consisting of amino, carboxylic acylamido and nitro and $R^2$ is selected from the group consisting of amino and carboxylic acylamido groups, with sulphuric acid.

2. The process of claim 1 in which the sulphuric acid employed is of at least 98% concentration.

3. A process for the production of a 2.7-disubstituted acridone in which each of the substituents contains a nitrogen atom directly linked to a nuclear carbon atom which comprises heating a 3':4-disubstituted diphenylamine - 2 - carboxylic acid of the general formula

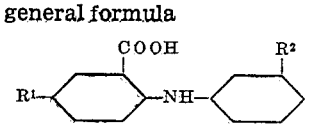

in which $R^1$ is selected from the group consisting of amino, carboxylic acylamido and nitro and $R^2$ is selected from the group consisting of amino and carboxylic acylamido, with concentrated sulphuric acid for about one and a half to two hours at about 100° C.

4. A process for the production of 2.7-diaminoacridone which comprises heating 3'-amino-4-acetamido diphenylamine-2-carboxylic acid with concentrated sulphuric acid.

5. The process of claim 4 in which the reaction mixture is heated at about 100° C. for about two hours.

6. A process for the production of 2-amino-7-nitroacridone which comprises heating 3'-amino-4-nitro-diphenylamine - 2 - carboxylic acid with concentrated sulphuric acid.

7. The process of claim 6 in which the reaction mixture is heated at about 100° C. for about one and a half hours.

8. A process for the production of 2-amino-7-nitroacridone which comprises heating 3'-acetamido-4-nitro-diphenylamine-2 - carboxylic acid with concentrated sulphuric acid.

9. The process of claim 8 in which the reaction mixture is heated at about 100° C. for about two hours.

ALAN AUGUST GOLDBERG.
WILLIAM KELLY.

REFERENCES CITED

The following references are of record in the file of this patent:

J. Chem. Soc., 1936, pp. 1614–1619.
J. Chem. Soc., 1938, pp. 22–26.
Gleu et al., J. Prakt. Chemie, vol. 153 (1939), page 201.
J. Soc. Chem. Ind. (Trans.), vol. 60, pp. 120–123 (1941).